United States Patent [19]

Lehrer

[11] Patent Number: 5,997,165
[45] Date of Patent: Dec. 7, 1999

[54] PORTABLE READING LIGHT DEVICE

[76] Inventor: Robert A. Lehrer, 7413, McCool Ave., Los Angeles, Calif. 90045

[21] Appl. No.: 08/847,292

[22] Filed: Apr. 24, 1997

[51] Int. Cl.$^6$ ........................................... F21V 7/04
[52] U.S. Cl. ........................... 362/581; 362/103; 362/105; 362/190; 362/191
[58] Field of Search .................................. 362/103, 105, 362/190, 191, 187, 188, 572, 581, 804, 574

[56] References Cited

U.S. PATENT DOCUMENTS

| D. 362,080 | 9/1995 | Lehrer | D26/39 |
|---|---|---|---|
| 1,187,672 | 6/1916 | Stiefvater . | |
| 1,294,752 | 2/1919 | Ballard | 600/249 |
| 1,392,165 | 9/1921 | Hunter . | |
| 2,117,967 | 5/1938 | Leipold | 240/59 |
| 2,725,462 | 11/1955 | Vorgang | 240/2 |
| 3,008,040 | 11/1961 | Moore | 240/41.15 |
| 3,250,909 | 5/1966 | Oldenburger | 240/10.6 |
| 3,285,242 | 11/1966 | Wallace | 362/103 |
| 3,624,384 | 11/1971 | Ledingham | 240/6.4 W |
| 3,634,676 | 1/1972 | Castellano | 240/6.4 W |
| 3,731,084 | 5/1973 | Trevorrow | 240/6.4 W |
| 3,814,926 | 6/1974 | Frasca | 240/6.4 W |
| 3,947,676 | 3/1976 | Battilana et al. | 240/6.4 W |
| 4,234,910 | 11/1980 | Price | 362/105 |
| 4,298,913 | 11/1981 | Lozar | 362/103 |
| 4,462,064 | 7/1984 | Schweitzer | 362/105 |
| 4,616,297 | 10/1986 | Liu | 362/105 |
| 4,631,644 | 12/1986 | Dannhauer | 362/105 |
| 4,718,126 | 1/1988 | Slay | 2/175 |
| 4,759,615 | 7/1988 | Bainbridge et al. | 350/399 |
| 4,794,496 | 12/1988 | Lanes et al. | 362/105 |
| 4,797,793 | 1/1989 | Fields | 362/105 |
| 4,916,596 | 4/1990 | Sharrah | 362/190 |
| 4,959,760 | 9/1990 | Wu | 362/105 |
| 4,969,069 | 11/1990 | Eichost | 362/105 |
| 4,970,631 | 11/1990 | Marshall | 362/105 |
| 5,034,862 | 7/1991 | Liston | 362/105 |
| 5,053,932 | 10/1991 | Case | 362/105 |
| 5,115,382 | 5/1992 | Smith | 362/105 |
| 5,117,510 | 6/1992 | Broussard et al. | 2/209.2 |
| 5,217,294 | 6/1993 | Liston | 362/105 |
| 5,230,558 | 7/1993 | Jong | 362/105 |
| 5,325,275 | 6/1994 | Liu | 362/80 |
| 5,353,205 | 10/1994 | Hudak | 362/105 |
| 5,430,620 | 7/1995 | Lehrer et al. | 362/105 |
| 5,558,428 | 9/1996 | Lehrer et al. | 362/105 |
| 5,754,719 | 5/1998 | Chen et al. | 385/34 |

*Primary Examiner*—Sandra O'Shea
*Assistant Examiner*—John A. Ward
*Attorney, Agent, or Firm*—Oppenheimer Wolff & Donnelly LLP

[57] ABSTRACT

A portable reading light device adapted to be worn about the head of a user or the like. The device utilizes a projection housing adapted to be used as the light source having the terminal end of a fiberoptic mounted therein, the other end extending to a remote lamp unit having a reflector and a light bulb mounted therein.

22 Claims, 5 Drawing Sheets

PORTABLE READING LIGHT DEVICE

BACKGROUND OF THE INVENTION

1. Field of the Invention

The invention relates to portable reading lights; and, more particularly, to a light device adapted to be worn by a user or the like.

2. Background of the Invention

Reading lights are well known in the art. In my U.S. Pat. No. 5,558,428, I disclose a portable reading light adapted to be worn about the head of a user. The light of the device projects a beam for reading a book or magazine or the like and is adjustable. The light of the device diffuses a beam substantially uniformly over a quadrilateral area so that the user can read a book or magazine with comfort.

Although this light device works quite well, the bulb used, disposed at the head of the user, generates quite a bit of heat. Increasing the intensity of the bulb to thus increase the amount of light generated would only add to the heat problem. There is thus a need for a reading light which puts out a sufficient amount of light without generating a large amount of heat at the output of the light source.

SUMMARY OF THE INVENTION

It is an object of this invention to provide a reading light using a fiberoptic as the output of light source.

It is still further an object of this invention to carry out the foregoing object maximizing the light output yet allowing one to vary the intensity of light output.

It is still further an object of this invention to carry out the foregoing objects eliminating the heat output of such prior art units at the output of the light source.

These and other objects are preferably accomplished by providing a portable reading light device that is adapted to be worn about the head of a user or the like. The device utilizes a projection housing adapted to be used as the light source having the terminal end of a fiberoptic mounted therein, the other end extending to a remote lamp unit having a reflector and a light bulb mounted therein.

DESCRIPTION OF THE PREFERRED EMBODIMENT

Figure 1:
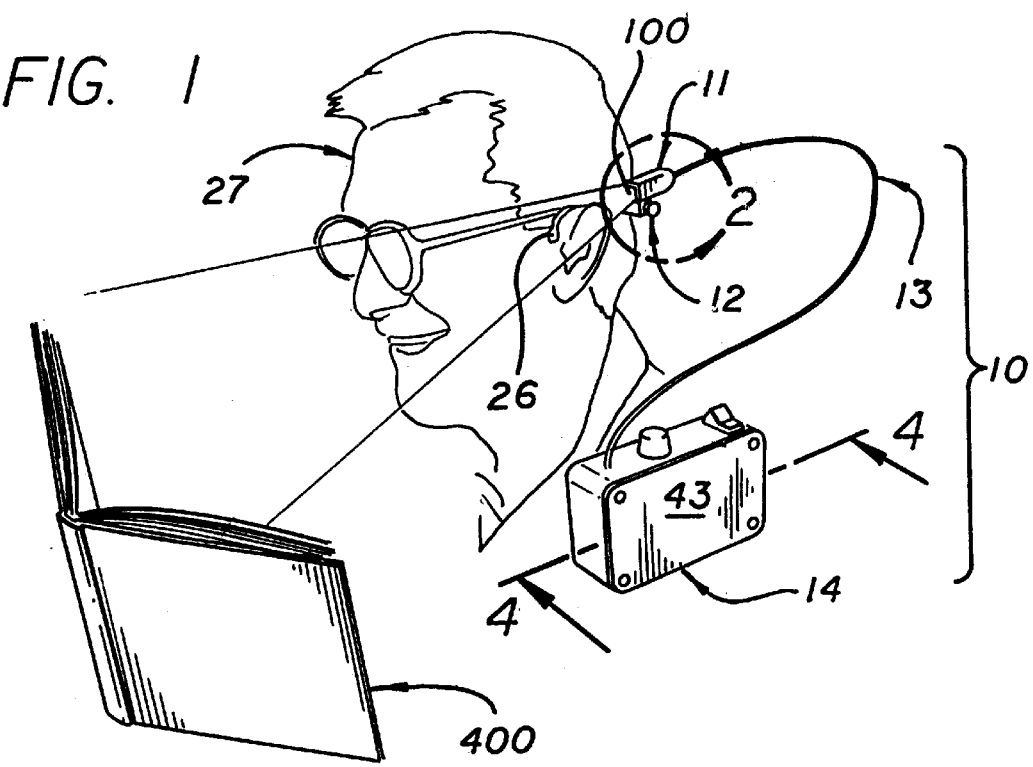
FIG. 1 is an perspective view of a light device worn by a user in accordance with the teaching of the invention.

Referring now to FIG. 1 of the drawing, device 10 is shown comprising a light projection housing 11, an integral clamping unit 12 (see also FIG. 2), a light fiberoptic 13 and a lamp unit 14 remote from projection housing 11.

Figure 2:
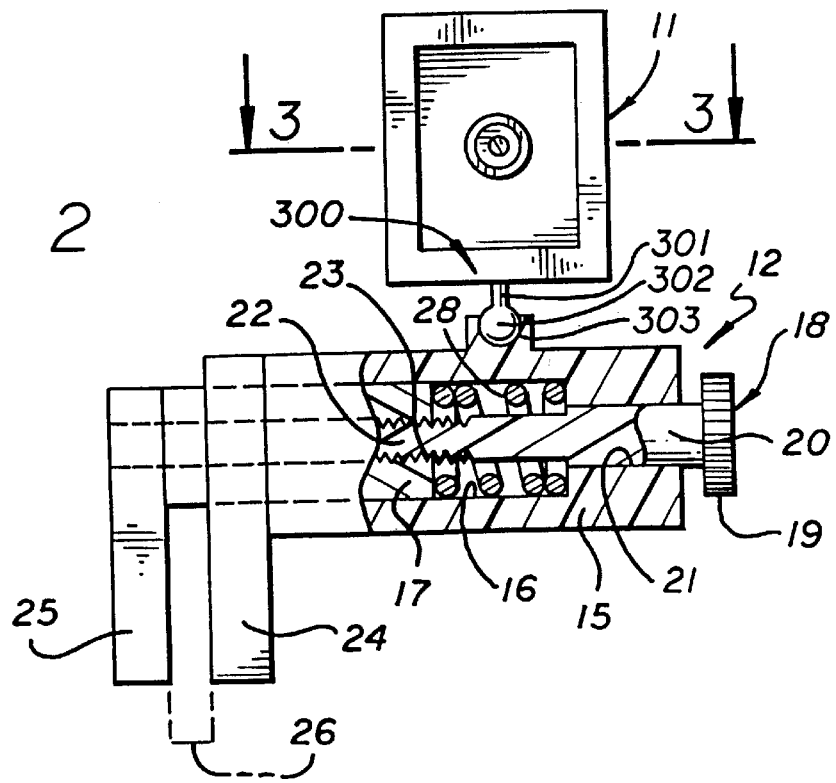
FIG. 2 is a view, partly in section, taken at line 2 of FIG. 1.

As seen in FIG. 2, light projection housing 11 is mounted on top of clamping unit 12 in any suitable manner. Preferably, a simple ball swivel arrangement 300 may be used to attach housing 11 to clamping unit 12. Thus, swivel arrangement 300 may have a shaft 301 secured to housing 11 terminating in a ball 302 rotatably mounted in a socket 303 fixed to clamping unit 12. The ball 302 may be rotatable in socket 303 yet retain a fixed position therein until moved due to its frictional relationship therein. The housing 11 thus can be adjusted to protect light into book 400 as seen in FIG. 1. Clamping unit 12 comprises a main housing 15 having an inner chamber 16 with a square shaped slide 17 slidably mounted therein. A thumb screw 18 is provided having an enlarged head 19, which may be of nylon, disposed outside of housing 15, and an integral shaft 20 extending into a hole 21 in housing 15 aligned with chamber 16 terminating in a threaded portion 22 threadably receivable in a like threaded aperture 23 in slide and fixed thereto. Housing 15 has an elongated flange portion 24 at the end opposite head 19, slide 17 extending therethrough. Slide 17 terminates in an elongated flange 25, fixed thereto, which is movable to and from flange 24 when head 19 is rotated thus moving flange 25 toward flange 24 clamping the earpiece 26 (shown in dotted lines) worn by user 27 in FIG. 1. If desired, a spring 28 (FIG. 2) may be provided within chamber 16 to resiliently bias flange 25 into clamping engagement with earpiece 26.

Figure 3:
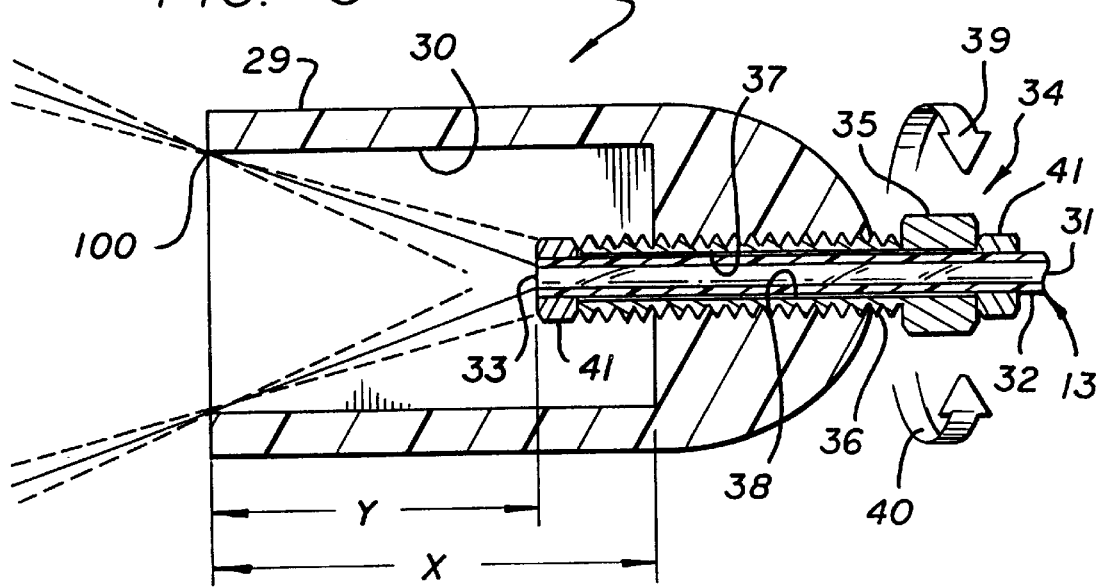
FIG. 3 is a view taken along lines 3—3 of FIG. 2.

Projection housing 11 is shown in FIG. 3 having a main housing unit 29, which may be rounded at the rear for aesthetic purposes, as an inner light chamber 30. Fiberoptic 13 includes an inner fiberoptic thread 31 and an outer jacket 32. The terminal end 33 of thread 31, inside of chamber 30, is polished to optimize its light output.

A bolt 34 is provided having an enlarged head 35, which may be hex-shaped, and an integral threaded shaft 36 threadably receivable in a like threaded opening 37 extending through housing unit 29 aligned with the generally central axis of chamber 30. A throughbore 38 extends through bolt 34 having optic 13 secured therein. Rotating head 35 of bolt 34 in the direction of arrows 39 or 40 thus moves optic 13 back and forth within chamber 30 thus varying the beam size projected of the light from optic 13 as indicated by the solid and dotted lines. A lock nut 41 may be provided about optic 13 adjacent nut head 35 to retain the same in a fixed position.

Figure 4:
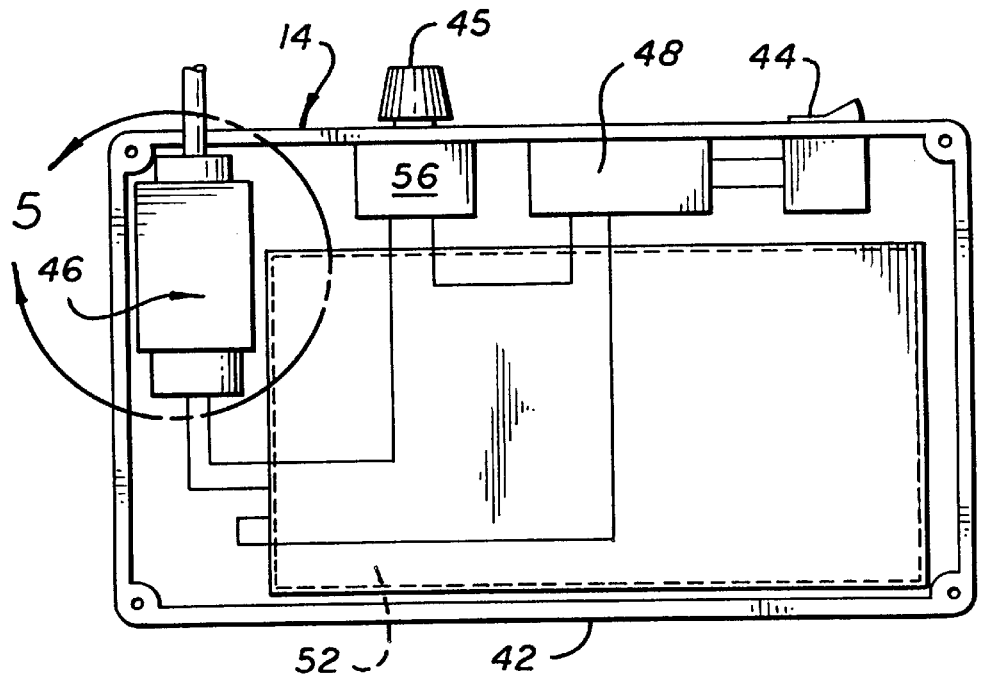
FIG. 4 is a view of the lamp unit alone of FIG. 1, taken along lines 4—4 of FIG. 1, the cover being removed for convenience of illustration.

Lamp unit 14, as shown in FIG. 4, has a main generally rectangular housing 42, normally closed off by a cover 43 (FIG. 1) having an on-off switch 44 accessible from the outside and a rheostat control knob 45, also accessible from the outside.

Lamp unit 14 also includes a lamp unit housing 46 receiving the free end of optic 13 extending from projection housing 11 therein.

Figure 6:
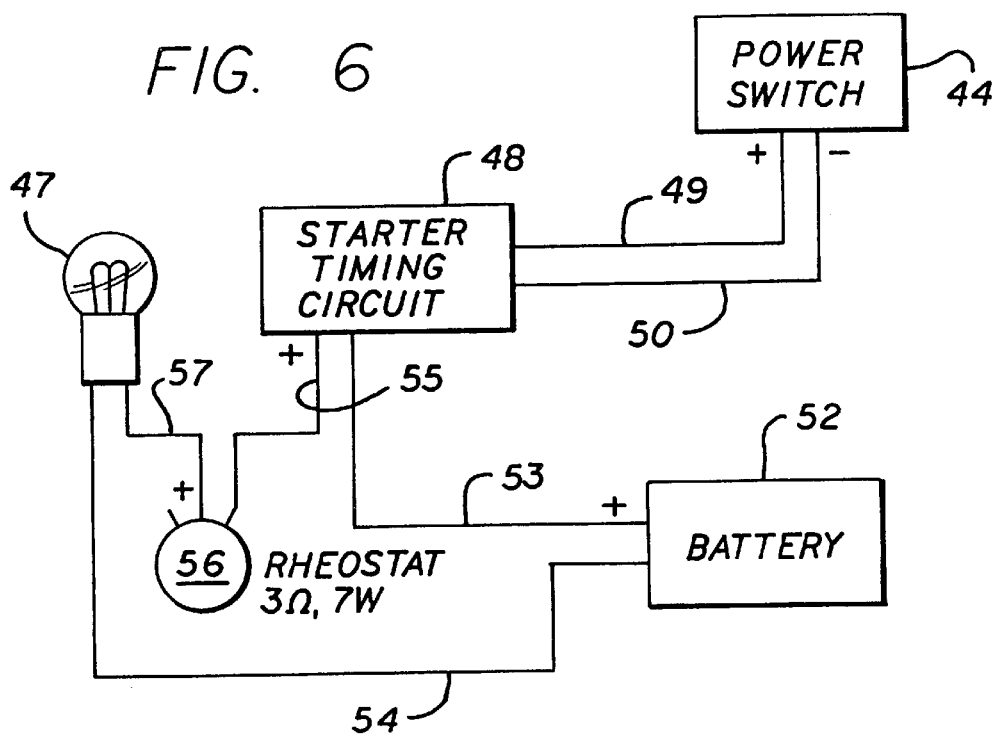
FIG. 6 is a schematic view of the circuitry of the device of FIG. 1.

Any suitable electronics may be used to power lamp 47 (which will be discussed—see FIG. 6) mounted inside of housing 46. For example, power switch 44 may be electronically coupled to a timing circuit 48 by leads 49, 50 (FIG. 6). Circuit 48 in turn receives power from battery 52 via positive lead 53. Negative lead 54 extends to lamp 47. Positive lead 55 from circuit 48 extends to rheostat 56, controlled by knob 45 (FIG. 4). The positive lead 57 (FIG. 6) from lamp 47 extends to rheostat 56. Rheostat 56, which could be a rheostat or resistor bank as is well known in the art, may be of any suitable type, such as 3 ohms, 7 watts.

Again, any suitable electronics, as will be discussed further, may be used.

Figure 5:
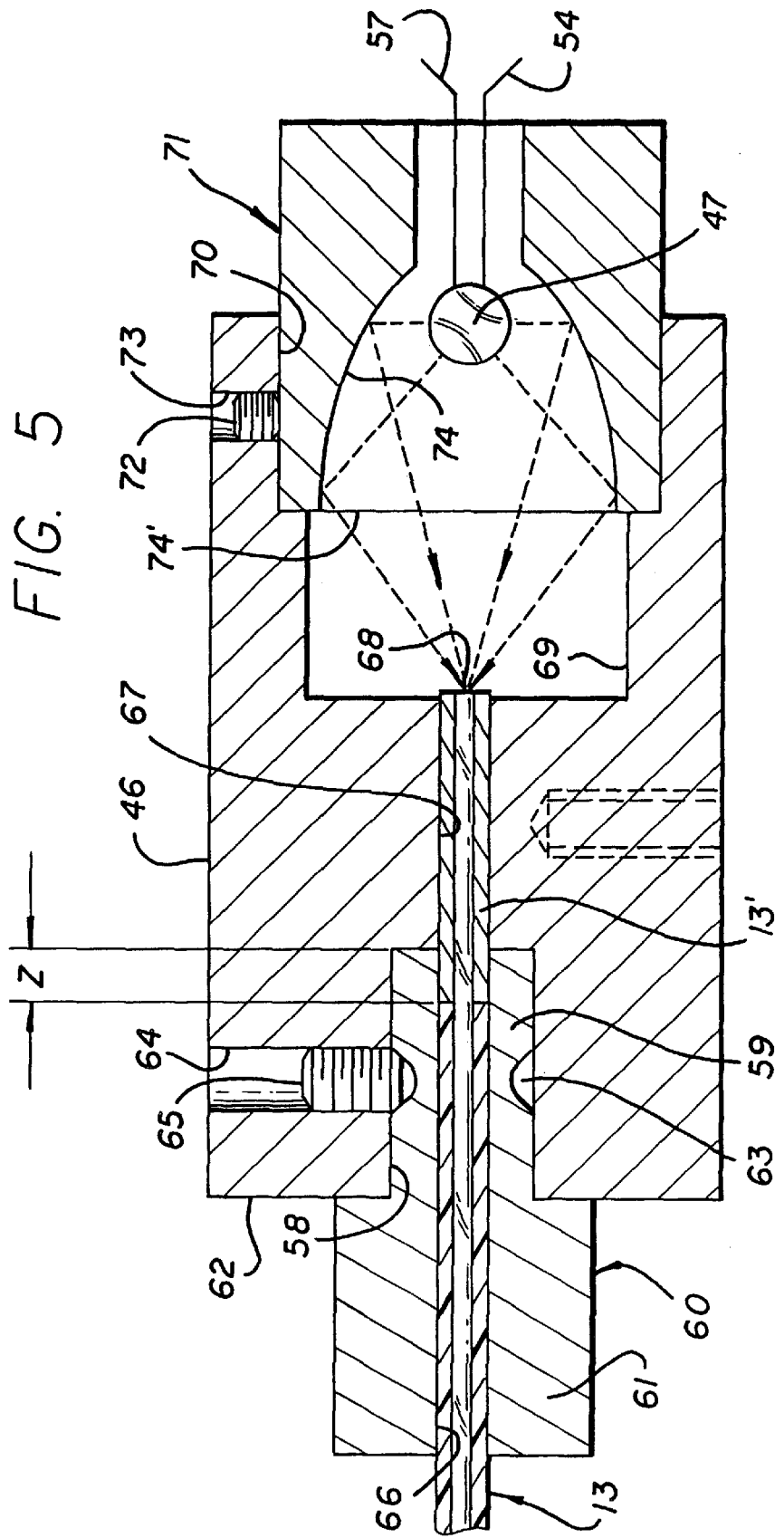
FIG. 5 is a cross-sectional view taken at line 5 of FIG. 4.

Housing 46 is shown in cross-sectional view in FIG. 5. Housing 46 has a throughbore 58 at one end receiving therein the reduced diameter portion 59 of a fiberoptic connector body member 60. Main body portion 61 of member 60, greater in diameter than portion 59, abuts against the rear wall 62 of housing 46 when portion 59 is inserted into throughbore 58. Portion 59 has an annular reduced neck portion 63 which is aligned with a threaded hole 64 extending through housing 46 transverse to opening 58. A threaded spring plunger 65 is threadably mounted in hole 64 adapted to extend into reduced neck portion 63 thus locking body member 60 in the position shown in FIG. 5. Optic 13 is stripped at its end and the stripped end is inserted through a throughbore 66 in body member 60 and into a brass or stainless steel tip 13' mounted in throughbore 67 press-fit into throughbore 66 in housing 60. Distance z may be about 7/64 inches. Throughbore 67 is coaxially aligned with throughbore 66. The terminal end 68 of the optic strand of optic 13 may be polished, as previously discussed, for maximum light input.

Body member 60 may be of any suitable plastic material, such as ABS plastic.

Housing 46 has a chamber 70 opening on the side thereof opposite throughbore 58, of a greater diameter than chamber 69. A lamp reflector housing 71 is mounted in chamber 70, retained therein by a threaded set screw 72 (or a spring plunger or clip may be used) threadably mounted in threaded hole 73 extending transverse to the central longitudinal axis of housing 46.

The housing 71 has a throughbore, opening to the exterior of housing 46 at one end and into a reflector portion 74, which is elliptical in cross-section, with lamp 47 mounted therein in any suitable manner. It can be seen by the dotted lines in FIG. 5 that the light rays reflected from bulb 47 reflect off of the walls of reflector portion 74 to the polished end 68 of fiberoptic 13.

The reflector portion 74 and housing 46 of FIG. 5 are both preferably of aluminum and portion 71 may have a preferred outer diameter of between about 0.50 to 1.5 inches. The reflector portion 74 may be about 0.75 to 1.5 inches in overall length. The opening 74' may be about 0.252 to 0.54 inches in diameter. The elliptical optimum refocus distance is about 0.37 to 0.74 inches. Thus, reflector 71 reflects the light and focuses it down to a pin point to the polished tip of optic 13.

Figure 7:
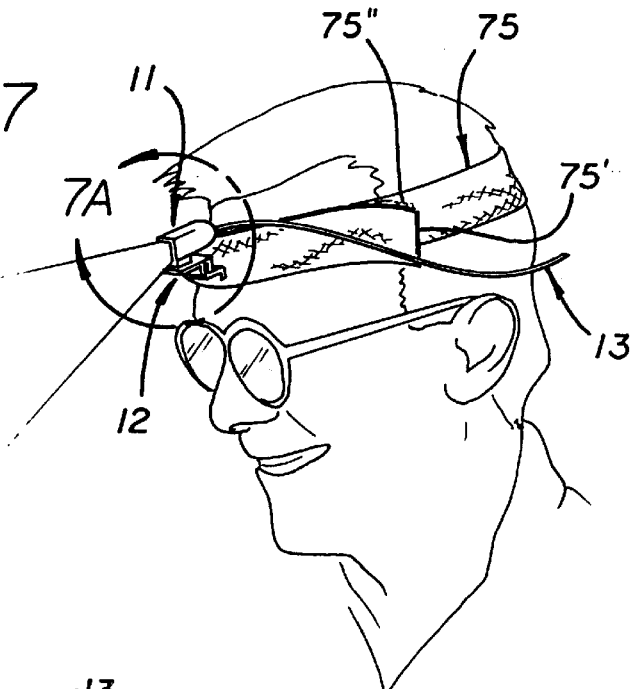
FIG. 7 is a perspective view of another embodiment of the manner in which the projection housing of the device of FIG. 1 may be mounted.
Figure 7A:
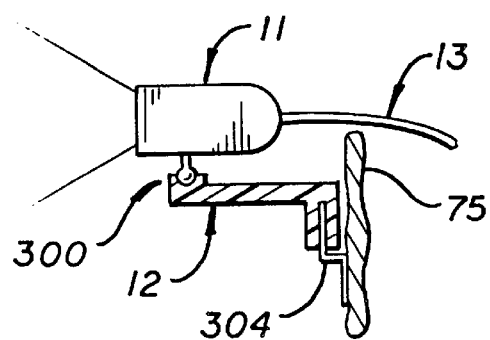
FIG. 7A is a view taken along line 7A—7A of FIG. 7.

Although projection housing 11 is shown in FIG. 1 as mounted on the earpiece of a user, as seen in FIG. 7 and FIG. 7A, it may be mounted to the adjustable headband 75 of a user. This may be accomplished in any suitable manner, such as by having a L-shaped flange 304 fixed to headband 75 to which clamping unit 12, ball swivel arrangement 300 and housing 11 may be secured to. Thus, the position of projection housing 11 and clamp 12 may be adjustable to vary the direction of the light output. Headband 75 may be adjustable using mating pieces of Velcro® material 75', 75" in the manner discussed in my U.S. Pat. No. 5,558,428.

The manner of connecting projection housing 11 and clamp 12 to the earpiece 26 of FIG. 1 may be adjusted merely by moving the clamp 12.

Figure 8:
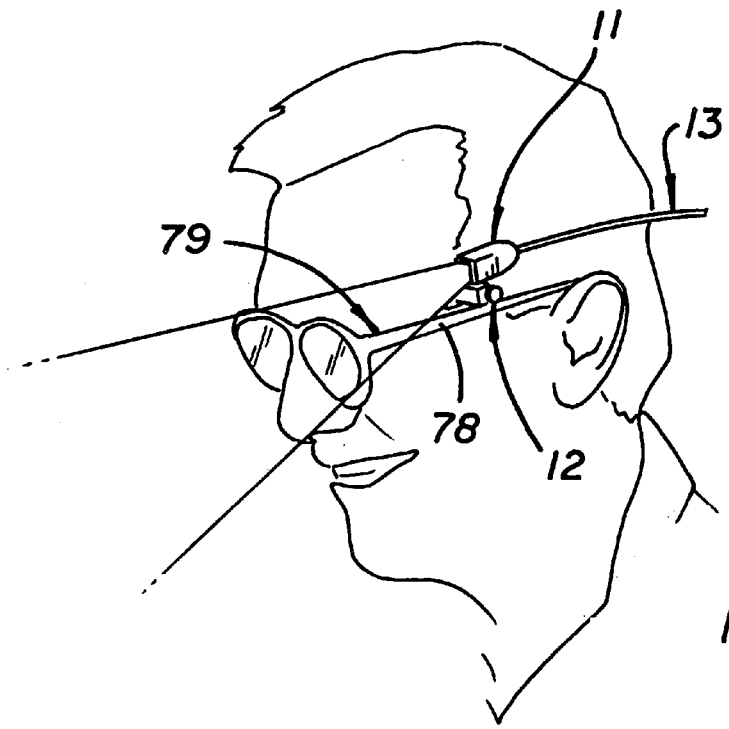
FIGS. 8 and 9 are perspective views of still further embodiments of the manner in which the projection housing of the device of FIG. 1 may be mounted.
Figure 9:
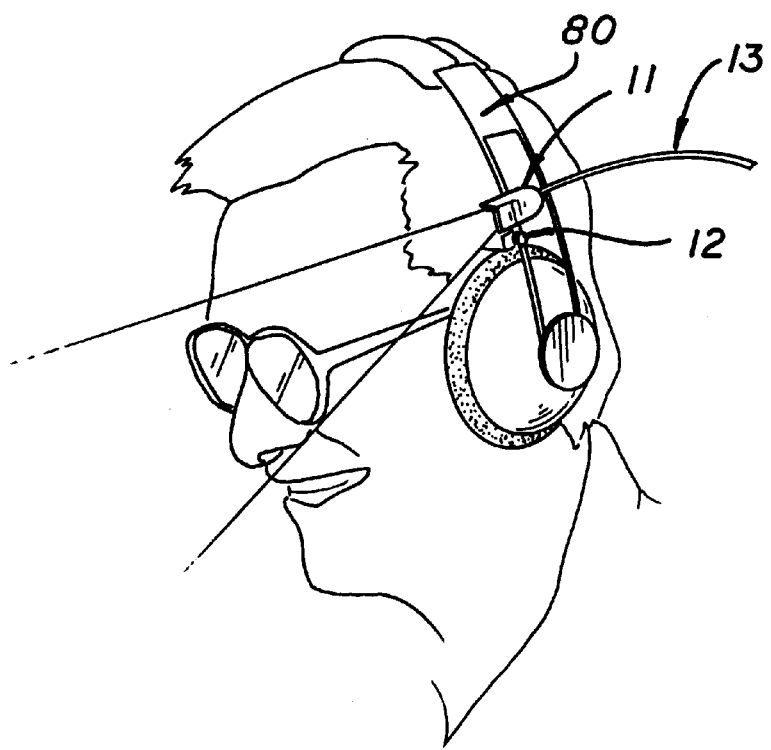

FIG. 8 shows still another variation wherein clamp 12 is clamped to the temple 78 of eyeglasses 79 by clamping the same therebetween in the manner of earpiece 26 in FIGS. 1 and 2. Finally, as seen in FIG. 9, clamp 12 may be clamped to earphones 80 worn by a user in the same manner.

Fiberoptic 13 may be of single or multi-stranded quartz or polymeric material and has an outer jacket of polyvinyl chloride material and about 3/32" in diameter and an inner optic fiber of about 1/32".

Any suitable high intensity lamp 47 may be used, such as the Xenon sub-miniature lamps sold by Carley Lamps of Torrance, Calif., particularly Model No. WCF-709. Such a bulb only draws about 5 volts and 1.2 amps. Any suitable source of power may be used, such as alkaline or ni-cad batteries, AC current, etc. Preferably, a 5 volt rechargeable battery may be used to power lamp 47 with a plug-in transformer to recharge the battery and provide power to lamp 47 when plugged in as is well known in the bed lamp art. Control for the timing circuit may be provided by a 9 volt transistor-type battery.

It can be seen that the combination of a miniature high intensity lamp 47 and a portable power source results in a high beam output with no heat at the output of the light.

As seen in FIGS. 1 and 3, the exit opening 100 of projection housing 11, which may be of black polyvinyl chloride material, may be rectangular-shaped (about 15/32" by 18/32") resulting in a rectangular-shaped beam of light. This shape, along with the relationship between the length of chamber 30 (see FIG. 3—x is about 3/4") and the distance y (which can be varied slightly and is between about 3/8" to 3/4") varies the size of the beam from exiting housing 11. Stray light is prevented from exiting the housing 11 by the blackened inside walls of the cavity 30 or the selection of non-reflective material for the housing 11. Thus, fiberoptic 13 is properly and precisely positioned to obtain proper illumination.

Any suitable means may be used to adjust or vary distance y in FIG. 3. Although exit 100 from housing 11 is shown as fixed, a hood, as shown in hood 55 in my U.S. Pat. No. 5,558,428, the teachings of which are incorporated herein by reference, may be used attached to housing 11 as shown in my patent.

As seen in FIG. 6, the control system may be comprised of a power switch 44, a rheostat, 56, a starter, and a timing circuit 48. The power switch 44 is used to turn the timing portion on and off thus turning the lighting subsystem on and off. The rheostat 56 is used to control the light intensity.

Turning the rheostat knob in one direction makes the light brighter, turning in the opposite direction makes the light dimmer. The starter portion simply resets and initializes the timer portion in the starting and timing circuit. The starting and timing circuit is the heart of this subsystem. The timing circuit portion may use a simple linear integrated timer in a one shot configuration to control a switching relay. When power has been applied to the timing circuit portion, the starter portion can then be used to reset and initialize the timer portion. Upon initialization, the timer portion closes the switching relay which turns on the lamp 47 and starts counting for its preset time period. When the preset time period has expired, the time portion opens the switching relay which turns off the lamp 47. The timing circuit will shut off the light after a predetermined period of time of use to save batteries or the like if the user fell asleep or otherwise did not turn it off.

The lighting subsystem, as partially exemplified in FIG. 6, is comprised of the miniature light source 47, the elliptical reflector 71 of FIG. 5, a lamp housing 46 (FIG. 5), a fiberoptic cable 13 (FIG. 5), and a projection housing 11 (FIGS. 1 and 3). The miniature light source 47 may be a small high intensity krypton lamp 47. This lamp 47 is positioned inside the elliptical reflector 71 so that all of the light from the bulb 47 is refocused to a small point. The lamp housing 46 holds reflector 71 and one end of the fiber optic cable 13 so that this small point of light falls on the end of the fiberoptic cable 13 at point 68. The cable 13 then carries the light along its length to the other end of the cable in the projection housing 11. As the light exits the cable 13, it conically spreads out in a uniform circular pattern. The aperture 100 of the projection housing 11 then shapes the light into a rectangular pattern by absorbing light that strikes the aperture and allowing the remainder to pass.

Size and shape of the projected light depends on the size and shape of the aperture 100, distance of the aperture 100 from the end 33 of the fiberoptic cable 13, and the distance of the aperture 100 to the target (e.g., the book read by the user).

If desired, a stranded quartz fiberoptic light guide may be used. The largest diameter fiberoptic cable 13 that is economically practical may be used. Flexibility, however, of the cable 13 should not be sacrificed.

In order to make the size of the project light adjustable, a threaded connector 34 may be used. The cable 13 should be able to rotate in the connector 34, but not be able to slide back and forth. When the connector is turned into the housing 11, the projection beam will become larger. When the connector 34 is turned out of the housing 11, the projection beam will become smaller.

In order to minimize projected ghosts, e.g., stray light rays, the inside of the projection housing 11 may be flat black or made of a non-reflective material so that there are no internal reflections. In order to increase reliability, a switching transistor may be used in place of the relay since a solid state device is generally better than a mechanical solution.

It can be seen that there is disclosed an improved bed lamp having a high light projection, which can be adjustable, remote from the lamp projecting such light. This results in elimination of heat at the output. Although a particular embodiment of the invention is disclosed, variations thereof may occur to an artisan and the scope of the invention should only be limited by the scope of the appended claims.

I claim:

1. A portable lightweight lamp for attachment to the body of a user comprising:

a light projection housing open at one open end terminating in a light output opening;

a lamp unit containing a reflector and a lamp bulb therein; and a fiberoptic having one end mounted in said housing and the other end mounted in said lamp unit, said fiberoptic having a terminal light beam output end at said one end adapted to focus a light beam out of the opening in said housing and a light beam focus end at said other end aligned with said bulb, said bulb being mounted at the focal point of said reflector and adapted to focus a light beam on said terminal light beam focus end of said fiberoptic whereby light travels along said fiberoptic to said light beam output end of said fiberoptic and out of the opening in said housing, said projection housing having a longitudinal axis aligned with generally the center of said opening and said terminal light beam output end of said fiberoptic being adjustable along the longitudinal axis of said projection housing.

2. A portable lightweight lamp for attachment to the body of a user comprising:

a light projection housing open at one open end terminating in a light output opening;

a lamp unit containing a reflector and a lamp bulb therein; and a fiberoptic having one end mounted in said housing and the other end mounted in said lamp unit, said fiberoptic having a terminal light beam output end at said one end adapted to focus a light beam out of the opening in said housing and a light beam focus end at said other end aligned with said bulb, said bulb being mounted at the focal point of said reflector and adapted to focus a light beam on said terminal light beam focus end of said fiberoptic whereby light travels along said fiberoptic to said light beam output end of said fiberoptic and out of the opening in said housing, said lamp further including an adjustable clamp coupled to said projection housing for clamping the same to an adjustable headband of a user or a book or the like.

3. In the lamp of claim 2 wherein an adjustable headband is provided having said clamp attached thereto.

4. In the lamp of claim 2 including an earpiece adapted to be worn by the user having said clamp attached thereto.

5. In the lamp of claim 1 said reflector is elliptical in configuration, said bulb being mounted at the focal point of said reflector.

6. In the lamp of claim 5 wherein said reflector is of aluminum.

7. A portable lightweight lamp for attachment to the body of a user comprising:

a light projection housing open at one open end terminating in a light output opening;

a lamp unit containing a reflector and a lamp bulb therein; and a fiberoptic having one end mounted in said housing and the other end mounted in said lamp unit, said fiberoptic having a terminal light beam output end at said one end adapted to focus a light beam out of the opening in said housing and a light beam focus end at said other end aligned with said bulb, said bulb being mounted at the focal point of said reflector and adapted to focus a light beam on said terminal light beam focus end of said fiberoptic whereby light travels along said fiberoptic to said light beam output end of said fiberoptic and out of the opening in said housing, said reflector being elliptical in configuration, said bulb being mounted at the focal point of said reflector, said diameter of said reflector being about 0.50 to 1.5 inches, the length of said bulb from the end of said reflector remote from its focal point being about 0.75 to 1.5 inches, and the focal point of said reflector to the terminal light beam focus end of said fiberoptic being about 0.37 to 0.74 inches.

8. A portable lightweight lamp for attachment to the body of a user comprising:

a light projection housing open at one end terminating in a light output opening;

a lamp unit containing a reflector and a lamp bulb therein; and a fiberoptic having one end mounted in said housing and the other end mounted in said lamp unit, said fiberoptic having a terminal light beam output end at said one end adapted to focus a light beam out of the opening in said housing and a light beam focus end at said other end aligned with said bulb, said bulb being mounted at the focal point of said reflector and adapted to focus a light beam on said terminal light beam focus end of said fiberoptic whereby light travels along said fiberoptic to said light beam output end of said fiberoptic and out of the opening in said housing, said opening being generally rectangular shaped.

9. In the lamp of claim 1 wherein said fiberoptic includes a center optic fiber thread and an outer jacket.

10. A portable lightweight lamp for attachment to the body of a user comprising:

a light projection housing open at one open end terminating in a light output opening;

a lamp unit containing a reflector and a lamp bulb therein; and a fiberoptic having one end mounted in said housing and the other end mounted in said lamp unit, said fiberoptic having a terminal light beam output end at said one end adapted to focus a light beam out of the opening in said housing and a light beam focus end at said other end aligned with said bulb, said bulb being mounted at the focal point of said reflector and adapted to focus a light beam on said terminal light beam focus end of said fiberoptic whereby light travels long said fiberoptic to said light beam output end of said fiberoptic and out of the opening in said housing, said fiberoptic including a center optic fiber thread and an outer jacket, said thread being of quartz and said jacket being of polyvinyl chloride material.

11. A portable lightweight lamp for attachment to the body of a user comprising:

a light projection housing open at one open end terminating in a light output opening;

a lamp unit containing a reflector and a lamp bulb therein; and a fiberoptic having one end mounted in said housing and the other end mounted in said lamp unit, said fiberoptic having a terminal light beam output end at said one end adapted to focus a light beam out of the opening in said housing and a light beam focus end at said other end aligned with said bulb, said bulb being mounted at the focal point of said reflector and adapted to focus a light beam on said terminal light beam focus end of said fiberoptic whereby light travels along said fiberoptic to said light beam output end of said fiberoptic and out of the opening in said housing, said lamp unit comprising an elongated main housing having a first opening leading therein into a light chamber, a reflector housing mounted in said main housing having a rear end remote from said first opening and a forward end providing said reflector, said fiberoptic being fixedly mounted within a fiberoptic connector having one end fixedly mounted in said first opening, said one end of said fiberoptic connector having a tip secured therein aligned with said fiberoptic mounted in said connector, said fiber optic focus end abutting against said tip, said tip extending away from said connector along the longitudinal axis of said main housing and opening in said light chamber.

12. In the lamp of claim 11 wherein said tip is of stainless steel.

13. In the lamp of claim 11 wherein said tip is of brass.

14. In the lamp of claim 11 wherein said housing is of plastic and said tip is press-fit into said housing.

15. A portable lightweight lamp for attachment to the body of a user comprising:

a light projection housing open at one open end terminating in a light output opening;

a lamp unit containing a reflector and a lamp bulb therein; and a fiberoptic having one end mounted in said housing and the other end mounted in said lamp unit, said fiberoptic having a terminal light beam output end at said one end adapted to focus a light beam out of the opening in said housing and a light beam focus end at said other end aligned with said bulb, said bulb focus end at said other end aligned with said bulb, said bulb being mounted at the focal point of said reflector and adapted to focus a light beam on said terminal light beam focus end of said fiberoptic whereby light travels along said fiberoptic to said light beam output end of said fiberoptic and out of the opening in said housing, the terminal ends of said fiberoptic being polished.

16. A portable lightweight lamp for attachment to the body of a user comprising:

a light projection housing open at one open end terminating in a light output opening;

a lamp unit containing a reflector and a lamp bulb therein; and a fiberoptic having one end mounted in said housing and the other end mounted in said lamp unit, said fiberoptic having a terminal light beam output end at said one end adapted to focus a light beam out of the opening in said housing and a light beam focus end at said other end aligned with said bulb, said bulb focus end at said other end aligned with said bulb, said bulb being mounted at the focal point of said reflector and adapted to focus a light beam on said terminal light beam focus end of said fiberoptic whereby light travels along said fiberoptic to said light beam output end of said fiberoptic and out of the opening in said housing, said projection housing being adjustably mounted on a headband extending about the head of a user.

17. A portable lightweight lamp for attachment to the body of a user comprising:

a light projection housing open at one open end terminating in a light output opening;

a lamp unit containing a reflector and a lamp bulb therein; and a fiberoptic having one end mounted in said housing and the other end mounted in said lamp unit, said fiberoptic having a terminal light beam output end at said one end adapted to focus a light beam out of the opening in said housing and a light beam focus end at said other end aligned with said bulb, said bulb focus end at said other end aligned with said bulb, said bulb being mounted at the focal point of said reflector and adapted to focus a light beam on said terminal light beam focus end of said fiberoptic whereby light travels along said fiberoptic to said light beam output end of said fiberoptic and out of the opening in said housing, said bulb being a high intensity bulb.

18. In the lamp of claim 17 wherein said bulb is a xenon gas sub-miniature bulb.

19. In the lamp of claim 18 wherein said bulb is a 5 volt, 1.2 amp. bulb.

20. A portable lightweight lamp for attachment to the body of a user comprising:

a light projection housing open at one open end terminating in a light output opening;

a lamp unit containing a reflector and a lamp bulb therein; and a fiberoptic having one end mounted in said housing and the other end mounted in said lamp unit, said fiberoptic having a terminal light beam output end at said one end adapted to focus a light beam out of the opening in said housing and a light beam focus end at said other end aligned with said bulb, said bulb focus end at said other end aligned with said bulb, said bulb being mounted at the focal point of said reflector and adapted to focus a light beam on said terminal light beam focus end of said fiberoptic whereby light travels along said fiberoptic to said light beam output end of said fiberoptic and out of the opening in said housing, said open end of said projection housing being about ¾" long and the distance from the terminal light beam output end from said opening leading out of said projection housing varying between about ⅜" to ¾".

21. A portable lightweight lamp for attachment to the body of a user comprising:

- a light projection housing open at one open end terminating in a light output opening;
- a lamp unit containing a reflector and a lamp bulb therein; and
- a fiberoptic having one end mounted in said housing and the other end mounted in said lamp unit, said fiberoptic having a terminal light beam output end at said one end adapted to focus a light beam out of the opening in said housing and a light beam focus end at said other end aligned with said bulb, said bulb focus end at said other end aligned with said bulb, said bulb being mounted at the focal point of said reflector and adapted to focus a light beam on said terminal light beam focus end of said fiberoptic whereby light travels along said fiberoptic to said light beam output end of said fiberoptic and out of the opening in said housing, said open end of said projection housing being a non-reflective surface.

22. A portable lightweight lamp for attachment to the body of a user comprising:

- a light projection housing open at one open end terminating in a light output opening;
- a lamp unit containing a reflector and a lamp bulb therein; and
- a fiberoptic having one end mounted in said housing and the other end mounted in said lamp unit, said fiberoptic having a terminal light beam output end at said one end adapted to focus a light beam out of the opening in said housing and a light beam focus end at said other end aligned with said bulb, said bulb focus end at said other end aligned with said bulb, said bulb being mounted at the focal point of said reflector and adapted to focus a light beam on said terminal light beam focus end of said fiberoptic whereby light travels along said fiberoptic to said light beam output end of said fiberoptic and out of the opening in said housing, said projection housing being swivelly adjustable to a clamp thereby permitting said housing to be adjusted with respect to said clamp.

* * * * *